W. M. SAEFKE.
VALVE.
APPLICATION FILED APR. 25, 1914.

1,153,343.

Patented Sept. 14, 1915.

WITNESSES.

INVENTOR.
William M. Saefke
By Morsell, Keeny & French
ATTORNEYS.

UNITED STATES PATENT OFFICE.

WILLIAM M. SAEFKE, OF MILWAUKEE, WISCONSIN, ASSIGNOR OF ONE-HALF TO HENRY SAEVKE, OF MILWAUKEE, WISCONSIN.

VALVE.

1,153,343.  Specification of Letters Patent.  Patented Sept. 14, 1915.

Application filed April 25, 1914. Serial No. 834,301.

*To all whom it may concern:*

Be it known that I, WILLIAM M. SAEFKE, a citizen of the United States, and resident of Milwaukee, in the county of Milwaukee and State of Wisconsin, have invented new and useful Improvements in Valves, of which the following is a description, reference being had to the accompanying drawings, which are a part of this specification.
The invention relates to valves, and more particularly to that kind which is employed on receptacles in which fluid is contained under pressure, and may, for example, be used as a blow-off valve for steam boilers.
Heretofore, valves have been constructed for use on receptacles in which fluid is contained under pressure, such as steam boilers, in which the valve is mounted on its seat adjacent the boiler, and when opened, projects inwardly to allow the water or steam to pass between the valve and its seat into the valve outlet. In devices of this character, the entire valve head is subjected to the action of the steam or water, and it has been found that the head of the valve becomes "wire-drawn" due to the action of the fluid under pressure upon it, in passing between the valve and its seat, which action forms lines or grooves on the surface of the valve, which results, after a time, in leakage of the valve.

One of the objects of this invention is, to prevent leakage of the valve in this manner, by providing a protective case for the valve head, which, when the valve is open, protects the head from becoming wire-drawn.

A further object of the invention is, to provide an extension adjacent the valve seat, to serve as a protective casing for the valve head.
Another object of the invention is, to provide an extension adjacent the valve seat and openings in said extension, to permit the fluid in the receptacle to pass behind the valve and into the valve outlet, when the valve is open, and to protect the surface of the valve head.

The invention further designs to provide a new and improved form of valve for use on receptacles containing fluid under pressure.
50 sure.

Figure 1:
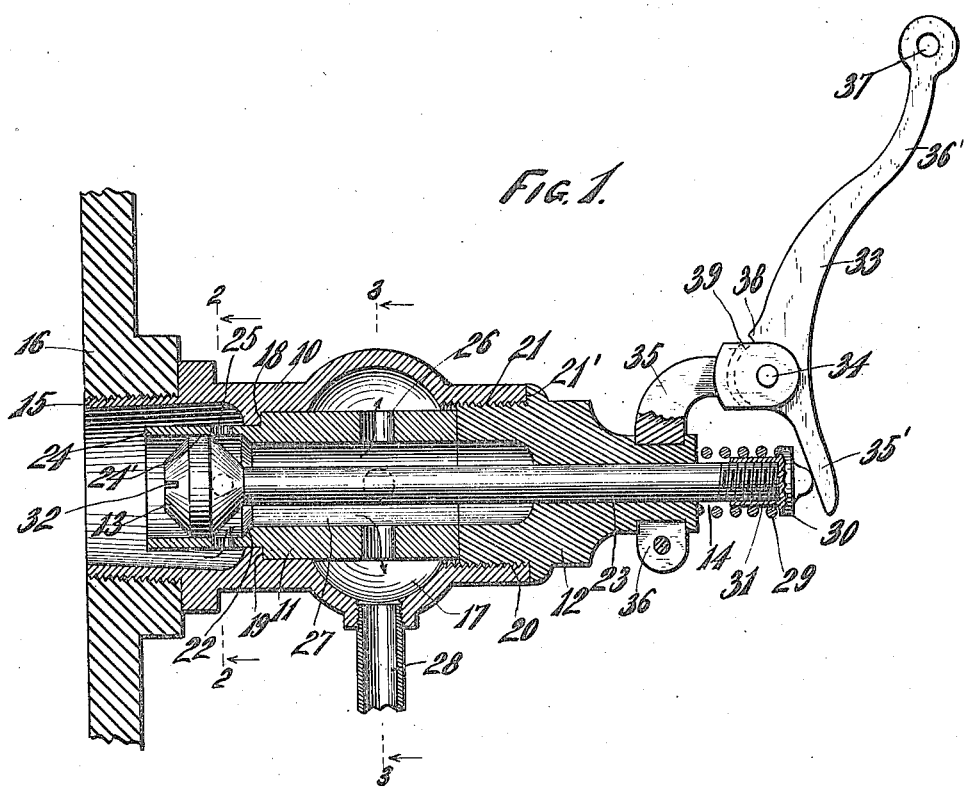
Figure 2:
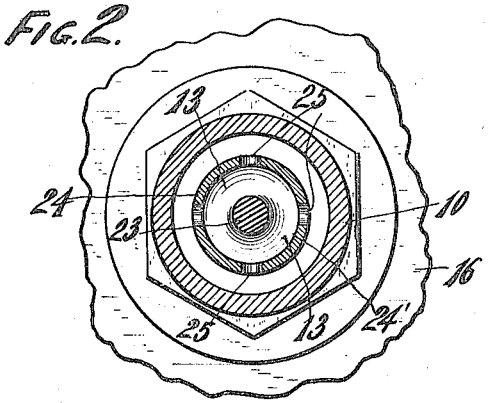
Figure 3:
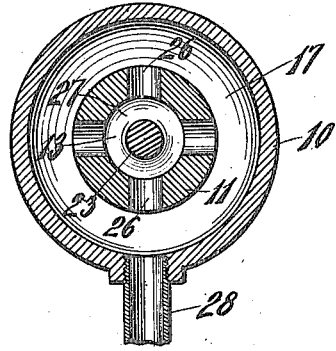

The invention consists in the several features hereinafter set forth, and more particularly defined by claims at the conclusion hereof.
In the drawings, Figure 1 is a vertical section of the device embodying the invention; Fig. 2 is a section taken on the line 2—2 of Fig. 1; Fig. 3 is a section taken on the line 3—3 of Fig. 1.

The device comprises an outer casing 10, an inner casing 11, a plug 12, a valve head 13 and valve stem 14, and means for operating the valve. The outer casing 10 is screw-threaded at one end 15, so that it may be securely fastened to a receptacle such as a steam boiler 16 (only a part of which is shown). This outer casing is provided, intermediate its length, with an enlarged, annular, interior recess 17, and is shouldered at 18, to permit the inner, cylindrical casing 11 to be seated within it, the shoulder 19 of said inner casing being designed to abut the shoulder 18 of the outer casing when the inner casing is placed in position.

The inner casing is securely held in position to the outer casing by the plug 12, which is screw-threaded at its inner end 20, to engage corresponding screw-threads 21 on the interior of the outer end of the valve casing 10. By the screwing up of the plug 12, the inner end of which abuts against one end of the inner casing 11, said casing is pushed into place against the shouldered seat 18 of the outer casing 10, and the plug 12 is provided with an annular flange 21' which rests against the outer end of the casing 10, when the parts are in assembled condition.

The valve head 13 and the stem 14 are preferably made in one piece, the valve head adapted to be seated within the inner casing 11 on its seat 22, and the stem projecting rearwardly through the bearing 23 in the plug 12. The outer side of the valve head 13 is conical in shape and fits against the conical seat 22 of the casing 11. The surface 24' of the valve 13 adjacent its conical portion is cylindrical, and is designed to slide within a hollow, cylindrical extension 24 of the inner casing 11, adjacent the seat 22 and extending inwardly therefrom. Openings 25 are provided in the extension 24, so that, when the valve is opened, the fluid or water under pressure will pass from the receptacle through the openings 25 and down behind the valve head 13. Openings 26 are also provided in the casing 11 adjacent the interior recess 17 in the outer casing 10, to permit the fluid passing from the receptacle and into the interior 27 of the casing 11, to escape through the openings 26 into the recess 17, and thence through the outlet 28.

The means for operating the valve comprises a spring 29 fitting around the outer end of the stem 14 and having one end resting upon the outer end of the plug 12 and secured into position on the stem by a nut 30 with a sleeve 31 which is threaded upon the stem, the valve head 13 having a notch 32 therein similar to a screwhead, so that the valve stem may be screwed into the sleeve 31 and thus hold the nut in position and adjust the tension of said spring. The spring 29 thus serves to hold the valve head 13 against its seat 22, and means are provided for moving the stem against the action of the spring to open the valve, said means comprising a bell crank lever 33 pivotally secured at 34 to a suitable support 35 which has depending arms 36 that are clamped in position around the outer end of the plug 12. One end 35' of the bell crank lever 33 is adapted to contact with the nut 30, and the other end 36' has an aperture 37 therein for receiving a cord or chain which may be pulled down and thus cause the arm 35' to push against the nut 30, and consequently move the valve stem 14 carrying the valve head 13 inwardly against the action of the spring 29, to open the valve. A stop 38 on the lever 33 engages a projection 39 on the support 35, to limit the outward movement of the arm 35'.

When the valve is opened, as shown in Fig. 1, the cylindrical surface 24' will slide within the protective casing 24 and prevent any water or any fluid from passing between the valve head 13 and the extension 24, the fluid flowing out from the receptacle, through the openings 25, into the interior cavity 27, through the openings 26 and out of the outlet 28, so that the action of the steam upon the valve head will be prevented, and there will always be a tight fit between the valve and its seat.

The invention thus exemplifies a valve which may be used on receptacles in which fluid is contained under pressure, and which is provided with means for protecting the valve head from the action of the fluid in the receptacle, when the valve is open.

The invention is not to be understood as restricted to the details of construction herein set forth, but may be varied within the scope of the appended claims.

What I claim is:

1. A valve for steam boilers comprising a metallic casing, a valve seat in said casing, an open ended tubular extension adjacent said seat, a valve rod slidably mounted in said casing and carrying a metal valve head slidably mounted in said extension and adapted to rest upon said seat to form a steam tight closure, said extension protecting the seat-contacting portion of said valve head from being wire-drawn by the action of the fluid within the boiler when the valve is open and having openings therein to permit the fluid to pass behind the valve head when the valve is open, and means for operating said valve.

2. A valve for steam boilers comprising a metallic casing, a flaring valve seat in said casing, an open ended tubular extension adjacent said seat, a valve rod slidably mounted in said casing and carrying a solid metal valve head slidably mounted in said extension, said valve head having a conical portion adapted to rest upon said seat to form a steam tight closure, said extension protecting the conical portion of the valve head from being wire-drawn by the action of the fluid within the boiler and having openings therein to permit the fluid to pass behind the valve head when the valve is open, and means for operating said valve.

3. A blow-off valve for steam boilers comprising an outer casing, a metallic inner casing fitting within said outer casing, a chamber formed between said inner and outer casing and having an outlet, said inner casing having openings therein communicating with said chamber, a valve seat in said inner casing, an open ended tubular extension integral with said inner casing and disposed adjacent said valve seat, a valve rod slidably mounted in said inner casing and carrying a metal valve head slidably mounted in said extension for engagement with said seat to form a steam tight closure, said extension preventing the seat contacting portion of the valve head from being wire-drawn under the action of the fluid within the boiler and having openings therein to permit the fluid to pass behind the valve head, when the valve is open, into said inner casing and through the openings therein into said chamber, and means for operating said valve.

In testimony whereof, I affix my signature, in presence of two witnesses.

WILLIAM M. SAEFKE.

Witnesses:
KATHERINE HOLT,
C. H. KEENEY.